United States Patent [19]
Magid

[11] Patent Number: 5,679,101
[45] Date of Patent: Oct. 21, 1997

[54] WALKER APPARATUS WITH LEFT AND RIGHT FOOT BELTS

[76] Inventor: Sidney Herman Magid, 4th Fl., No. 10, Lane 169, Sec. 1, Da-An Rd., Taipei, Taiwan

[21] Appl. No.: 638,956

[22] Filed: Apr. 24, 1996

Related U.S. Application Data

[63] Continuation of Ser. No. 276,996, Jul. 19, 1994, Pat. No. 5,538,489, which is a continuation-in-part of Ser. No. 236,585, May 2, 1994, abandoned, which is a continuation-in-part of Ser. No. 169,143, Dec. 17, 1993, Pat. No. 5,411,279.

[51] Int. Cl.$^6$ .................................................. A63B 22/02
[52] U.S. Cl. ............................................................ 482/54
[58] Field of Search ................................................ 482/54

[56] References Cited

U.S. PATENT DOCUMENTS

| | | |
|---|---|---|
| 2,460,017 | 1/1949 | Lautrup et al. . |
| 2,873,848 | 2/1959 | Steinmetz . |
| 3,967,720 | 7/1976 | Arieh . |
| 4,204,673 | 5/1980 | Speer, Sr. . |
| 4,325,421 | 4/1982 | Janovick et al. . |
| 4,334,676 | 6/1982 | Shönenberger . |
| 4,423,864 | 1/1984 | Wiik . |
| 4,548,316 | 10/1985 | Mauer . |
| 4,562,920 | 1/1986 | Jaffre . |
| 4,743,008 | 5/1988 | Femaglich et al. . |
| 4,872,664 | 10/1989 | Parker . |
| 5,336,146 | 8/1994 | Piaget et al. . |

FOREIGN PATENT DOCUMENTS

961712 A 9/1982 U.S.S.R. .

*Primary Examiner*—Lynne A. Reichard
*Attorney, Agent, or Firm*—Merchant, Gould, Smith, Edell, Welter & Schmidt, P.A.

[57] ABSTRACT

A walker apparatus includes a base, a pair of front rollers mounted rotatably on a first shaft which extends from a front left side to a front right side of the base, a pair of rear rollers mounted rotatably on a second shaft which extends from a rear left side to a rear right side of the base, endless left and right foot belts engaging respectively one of the front rollers and one of the rear rollers, and a support unit disposed between the front and rear rollers to provide a supporting surface for the foot belts. The foot belts move independently and are to be treaded respectively by the left and right feet of the user, thereby preventing the action of the user's left foot from influencing the action of his right foot and vice-versa when the walker apparatus is in use. The walker apparatus may be used with a functional supporting frame that is in the form of a baby chair, a baby stroller, an exercise walker or any other suitable form.

19 Claims, 7 Drawing Sheets

WALKER APPARATUS WITH LEFT AND RIGHT FOOT BELTS

CROSS-REFERENCE TO RELATED APPLICATIONS

This is a Continuation of application Ser. No. 08/276,996, filed on Jul. 19, 1994 now U.S. Pat. No. 5,538,489 which is a continuation-in-part of U.S. patent application Ser. No. 08/236,585 filed on May 2,1994 now abandoned and which in turn, is a continuation-in-part application of application Ser. No. 08/169,143 that was filed on Dec. 17, 1993 and that issued as U.S. Pat. No. 5,411,279 on May 2, 1995, which applications are hereby incorporated by reference.

BACKGROUND OF THE INVENTION

1. Field of the Invention

The invention relates to a walker apparatus, more particularly to a walker apparatus which prevents the action of the user's left foot from influencing the action of his right foot and vice-versa when the walker apparatus is in use.

2. Description of the Related Art

Referring to FIG. 1, a running track disclosed in Russian Patent No. 961,712 and issued to Morozov comprises an endless rubberized bearing belt (B1) mounted on pulleys (P) and a support deck (D) under the upper branch of the bearing belt (B1). An inner endless belt (B2) is rounded freely on the support deck (D) and is made of a material which has anti-friction properties with respect to the surface of the support deck (D).

The running track of Morozov is not suited for use as a walker apparatus by people with uncoordinated feet movement, such as small children, physically handicapped people and old people, since the left and right feet of the user tread a single, wide bearing belt (B1) at the same time. Thus, a twisting moment (T1), (T2) applied by either the left foot (L) or the right foot (R) when treading the left-side or right-side parts of the bearing belt (B1) may influence smooth running of the latter relative to the inner endless belt (B2).

SUMMARY OF THE INVENTION

Therefore, the object of the present invention is to provide a walker apparatus which prevents the action of the user's left foot from influencing the action of his right foot and vice-versa when the walker apparatus is in use.

More specifically, the object of the present invention is to provide a walker apparatus with left and right foot belts that move independently and that are to be treaded respectively by the left and right feet of the user, thereby preventing the action of the user's left from influencing the action of his right foot and vice-versa when the walker apparatus is in use.

Another objective of the present invention is to provide a walker apparatus which may be used with the functional supporting frame of an exercise walker, the latter having an adjustable hand bar for use by small children, physically handicapped people, old people and by those who feel more confident holding onto something while exercising.

Still another objective of the present invention is to provide a walker apparatus which may be used with the functional supporting frame of a baby stroller or a baby chair so as to provide a safe and effective way for exercising a baby and for teaching the baby to stand and walk.

Accordingly, the walker apparatus of the present invention comprises a base, a pair of front rollers, a pair of rear rollers, endless left and right foot belts, and a support means. The base has front left and right sides, a first shaft extending from the front left side to the front right side, rear left and right sides, and a second shaft extending from the rear left side to the rear right side. The front rollers are mounted rotatably on the first shaft and are disposed respectively on the front left and right sides of the base. The rear rollers are mounted rotatably on the second shaft and are disposed respectively on the rear left and right sides of the base. Each of the foot belts engages a respective one of the front rollers and a respective one of the rear rollers. The support means is disposed between the pair of front rollers and the pair of rear rollers and provides a supporting surface for the foot belts. Thus, the presence of a moving weight which moves separately on the foot belts between the pair of front rollers and the pair of rear rollers will cause the foot belts to move and the front and rear rollers to rotate.

The base may further have a pair of spaced front brackets disposed adjacent to the front left and right sides thereof and a pair of spaced rear brackets disposed adjacent to the rear left and right sides thereof. The first shaft has two ends fixed respectively to the front brackets, while the second shaft has two ends fixed respectively to the rear brackets. The first shaft has a central portion provided with a spacer to separate the front rollers, and two opposite end portions provided with a pair of retainers to limit lateral movement of the front rollers. The second shaft similarly has a central portion provided with a spacer to separate the rear rollers, and two opposite end portions provided with a pair of retainers to limit lateral movement of the rear rollers.

Each of the front rollers has an outer end with a ratchet gear attached thereto. The base further has a pair of pawls which engage releasably and respectively the ratchet gears on the front rollers.

In one embodiment of the walker apparatus of the present invention, each of the endless left and right foot belts has a frictional inner surface and is wound circulatively on the respective one of the front rollers and on the respective one of the rear rollers, and the support means comprises an elongate substrate plate and endless left and right inner belts. The substrate plate is secured on the base and has left and right sides, a flat slippery top surface and two arcuate ends. The inner belts are wound circulatively on the arcuate ends of the substrate plate and are disposed respectively on the left and right sides of the substrate plate. Each of the inner belts has a slippery inner surface that contacts the substrate plate and a frictional outer surface that contacts the frictional inner surface of a respective one of the foot belts. The substrate plate further has an upwardly projecting longitudinal partition member which separates the inner belts and the foot belts, and a pair of upwardly extending flanges which extend on opposite longitudinal edges of the substrate plate to limit lateral movement of the inner belts and the foot belts.

In another embodiment of the walker apparatus of the present invention, each of the endless left and right foot belts is wound circulatively on the respective one of the front rollers and on the respective one of the rear rollers, and the support means comprises a plurality of adjacent parallel third shafts between the front and rear rollers and having axes parallel to the first and second shafts, and a plurality of pairs of intermediate left and right rollers. Each of the pairs of intermediate left and right rollers is mounted rotatably on a respective one of the third shafts such that each of the intermediate right rollers contacts the right foot belt, while each of the intermediate left rollers contacts the left foot belt. Each of the third shafts has a central portion provided with a spacer to separate the intermediate left and right rollers thereon, and two opposite end portions provided with a pair of retainers to limit lateral movement of the intermediate left and right rollers thereon.

In a further embodiment of the walker apparatus of the present invention, the support means comprises a substrate plate secured on the base and having a slippery top surface, and front and rear pairs of substrate end rollers mounted on the base adjacent to front and rear ends of the substrate plate and adjacent to a respective one of the pairs of front and rear rollers. Each of the substrate end rollers has a slippery surface. Each of the foot belts has a slippery inner surface that contacts the substrate plate and a frictional outer surface. Each of the foot belts is wound around the substrate plate and passes between and is in operating contact with one of the front rollers and one of the front pair of substrate end rollers and further passes between and is in operating contact with one of the rear rollers and one of the rear pair of substrate end rollers. The substrate plate further has an upwardly projecting longitudinal partition member which separates the foot belts, and a pair of upwardly extending flanges which extend on opposite longitudinal edges of the substrate plate to limit lateral movement of the foot belts.

Any one of the different embodiments of the walker apparatus of the present invention may further comprise the functional supporting frame of an exercise walker, a baby chair or a baby stroller. When used as an exercise walker, the walker apparatus is an ideal way of losing weight and keeping fit. When used as a baby chair or baby stroller, the walker apparatus provides a safe and effective way for exercising a baby and for teaching the baby to stand and walk.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
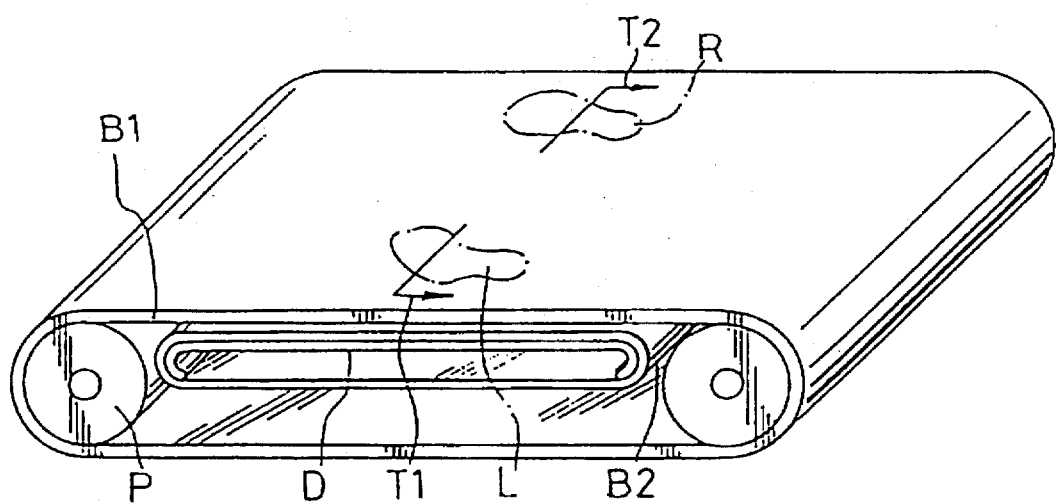
FIG. 1 illustrates a conventional running track which uses outer and inner endless belts.

Before the present invention is described in greater detail, it should be noted that like elements are indicated by the same reference numerals throughout the disclosure.

Figure 2:
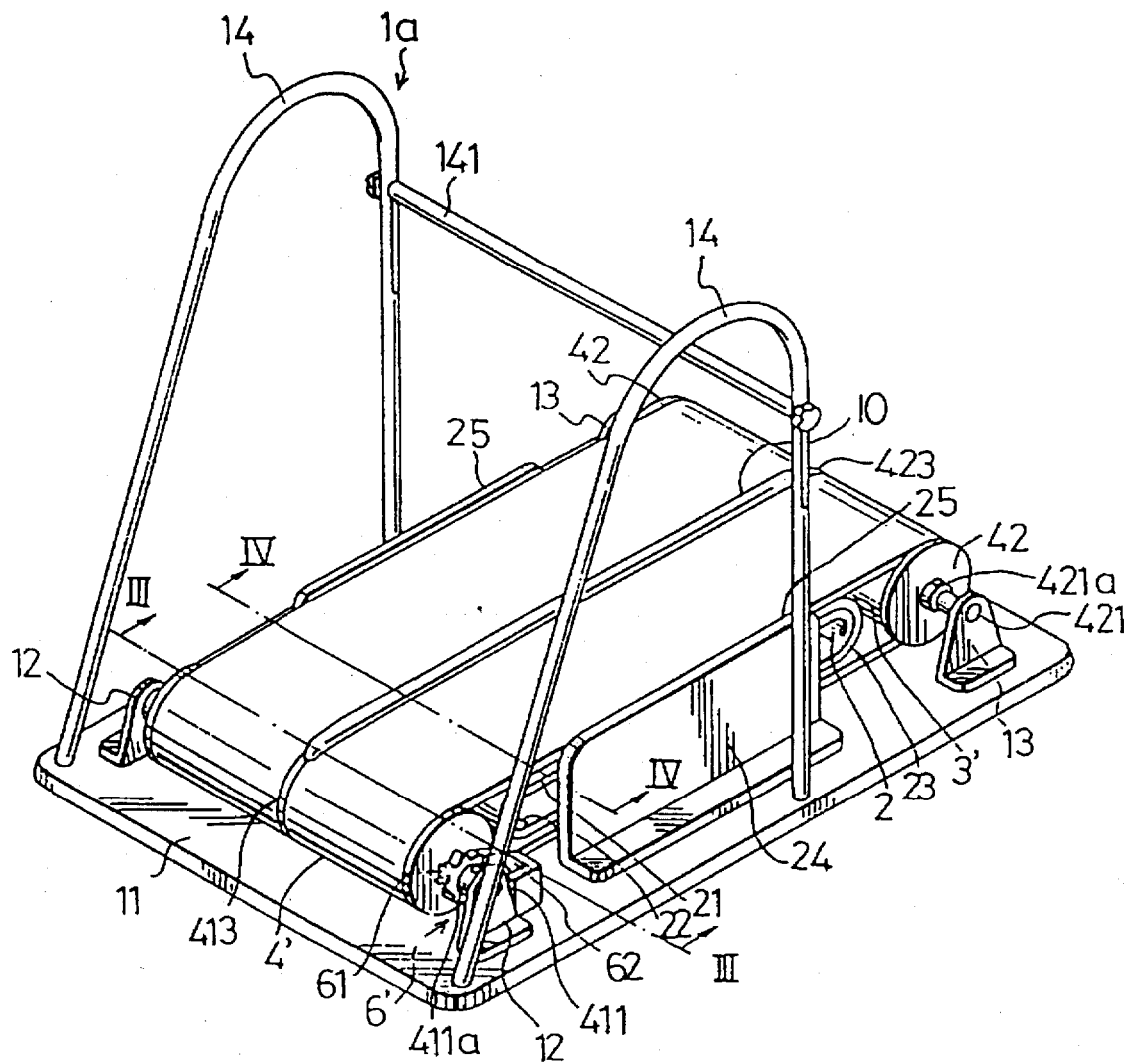
FIG. 2 is a perspective view of the first preferred embodiment of a walker apparatus according to the present invention, the first preferred embodiment being attached to a first example of a functional supporting frame so as to serve as an exercise walker.
Figure 3:
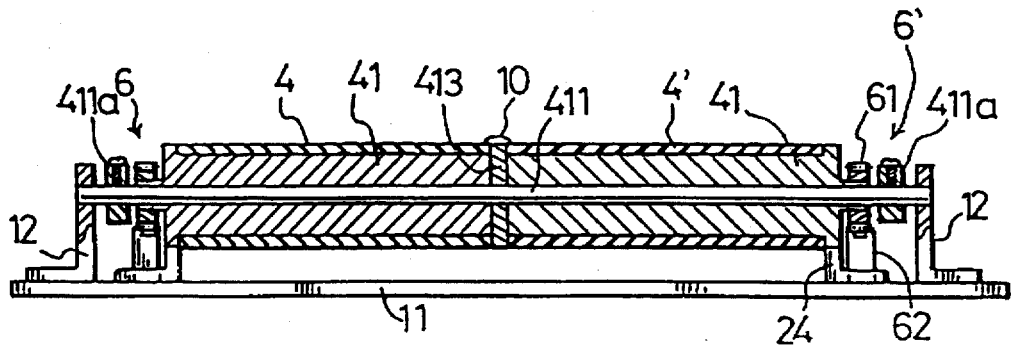
FIG. 3 is a sectional view of FIG. 2 taken along line III—III.
Figure 4:
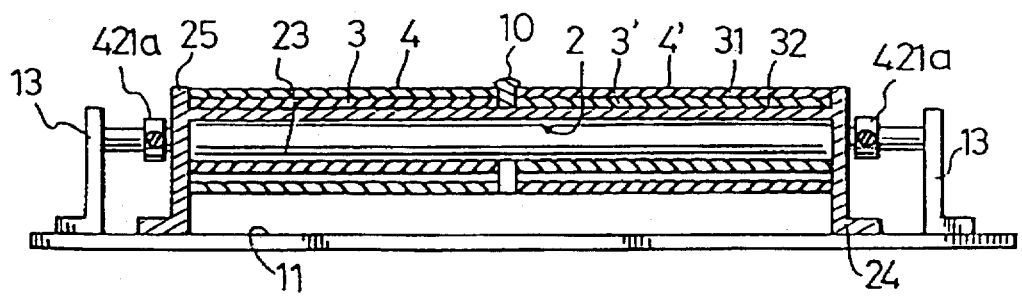
FIG. 4 is a sectional view of FIG. 2 taken along line IV—IV.

Referring to FIGS. 2 to 4, the first preferred embodiment of a walker apparatus according to the present invention is shown to comprise a base 11, a pair of front rollers 41, a pair of rear rollers 42, endless left and right foot belts 4, 4', and a support unit.

The base 11 has a pair of spaced front brackets 12 disposed adjacent to front left and right sides of the base 11, a first shaft 411 which extends from the front left side to the front right side and which has two ends fixed respectively to the front brackets 12, a pair of spaced rear brackets 13 disposed adjacent to rear left and right sides of the base 11, and a second shaft 421 which extends from the rear left side to the rear right side and which has two ends secured on the rear brackets 13.

The front rollers 41 are mounted rotatably on the first shaft 411 and are disposed respectively on the front left and right sides of the base 11. A spacer 413 is mounted rotatably on a central portion of the first shaft 411 to separate the front rollers 41. The first shaft 411 is further provided with a pair of retainers 411a on two opposite end portions thereof to limit lateral movement of the front rollers 41.

The rear rollers 42 are mounted rotatably on the second shaft 421 and are disposed respectively on rear left and right sides of the base 11. A spacer 423 is mounted rotatably on a central portion of the second shaft 421 to separate the rear rollers 42. The second shaft 421 is further provided with a pair of retainers 421a on two opposite end portions thereof to limit lateral movement of the rear rollers 42.

Each of the foot belts 4, 4' engages a respective one of the front rollers 41 and a respective one of the rear rollers 42. In this embodiment, the foot belts 4, 4' are wound circulatively on the respective one of the front rollers 41 and on the respective one of the rear rollers 42.

A unidirectional control means 6, 6' is installed to permit only unidirectional movement of the left and right foot belts 4, 4'. In this embodiment, the control means 6, 6' includes a pair of ratchet gears 61 attached to outer ends of the front rollers 41 and mounted rotatably on the first shaft 411, and a pair of pawls 62 secured to the base 11 and engaging one of the ratchet gears 61 to permit only unidirectional rotation of the front rollers 41, thereby preventing bidirectional movement of the foot belts 4, 4'. A releasable means (not shown) may be provided to release selectively the pawls 62 from the ratchet gears 61 in a known manner to permit reciprocating movement of the foot belts 4, 4' when desired. Of course, the ratchet gears may be attached to the rear rollers 42 to achieve the same result.

The support unit is disposed between the pair of front rollers 41 and the pair of rear rollers 42 and provides a substantially flat supporting surface for the foot belts 4, 4'.

In this embodiment, the support unit includes an elongate substrate plate 2 secured on a pair of side brackets 24 that extend upwardly from opposite longitudinal sides of the base 11, and endless left and right inner belts 3, 3' wound respectively on left and right sides of the substrate plate 2. The substrate plate 2 has a pair of upwardly extending flanges 25 which extend on opposite longitudinal edges thereof to limit lateral movement of the inner belts 3, 3' and the foot belts 4, 4'.

The substrate plate 2 has a flat slippery top surface 21 and arcuate front and rear ends 22, 23. The inner belts 3, 3' are wound circulatively on the arcuate ends 22, 23 of the substrate plate 2 and are disposed respectively on left and right sides of the substrate plate 2. Each of the inner belts 3, 3' has a slippery inner surface 32 that contacts the top surface 21 or the substrate plate 2, and a frictional outer surface 31 that contacts a respective one of the foot belts 4, 4'. Each of the foot belts 4, 4' has frictional inner and outer surfaces and an upper branch which overlaps the respective one of the inner belts 3, 3'. Preferably, the substrate plate 2 has an upwardly projecting longitudinal partition member 10 which separates the inner belts 3, 3' and the foot belts 4, 4'.

When in use, the user's feet drive a respective foot belt 4, 4', rather than a single, common wide belt as taught in the conventional running track described beforehand. Thus, the foot belts 4, 4' move independently when treaded by the left and right feet of the user, thereby preventing the action of the user's left foot from influencing the action of his right foot and vice-versa to permit natural, comfortable and a more ergonomic form of walking when the walker apparatus of the present invention is in use.

When the user applies a moving weight, such as his left and right feet, on the left and right foot belts 4, 4' between the pair of front rollers 41 and the pair of rear rollers 42, the foot belts 4, 4' will drive frictionally the rollers 41, 42. Due to the slippery top surface 21 of the substrate plate 2 and the slippery inner surface 32 of the inner belts 3, 3', and due to the frictional outer surface 31 of the inner belts 3, 3' and the frictional inner surface of the foot belts 4, 4', the foot belts 4, 4' and the inner belts 3, 3' slide smoothly on the substrate plate 2 when the user treads on the foot belts 4, 4'. The frictional outer surface of the foot belts 4, 4' ensures traction with the user's feet so as to enable the foot belts 4, 4' to be driven properly.

It is noted that the arcuate ends 22, 23 of the substrate plate 2 may be replaced by two pairs of rollers (not shown) to achieve the same effect.

Referring once more to FIG. 2, the base 11 is attachable to a functional supporting frame 1a. In this embodiment, the functional supporting frame 1a comprises a pair of handrails 14 mounted on opposite longitudinal sides of the base 11 to permit use of the walker apparatus as an exercise walker. The handrails 14 are generally inverted V-shaped, and a hand bar 141 extends between the handrails 14 and has two ends connected adjustably along one side of each of the handrails 14 in a known manner. The walker apparatus is thus ideal for use by small children, physically handicapped people, old people and by those who feel more confident holding onto something while exercising. This form of an exercise walker belongs in hospitals and in retirement homes, and is ideal for use by those who wish to keep fit and lose weight.

Figure 5:
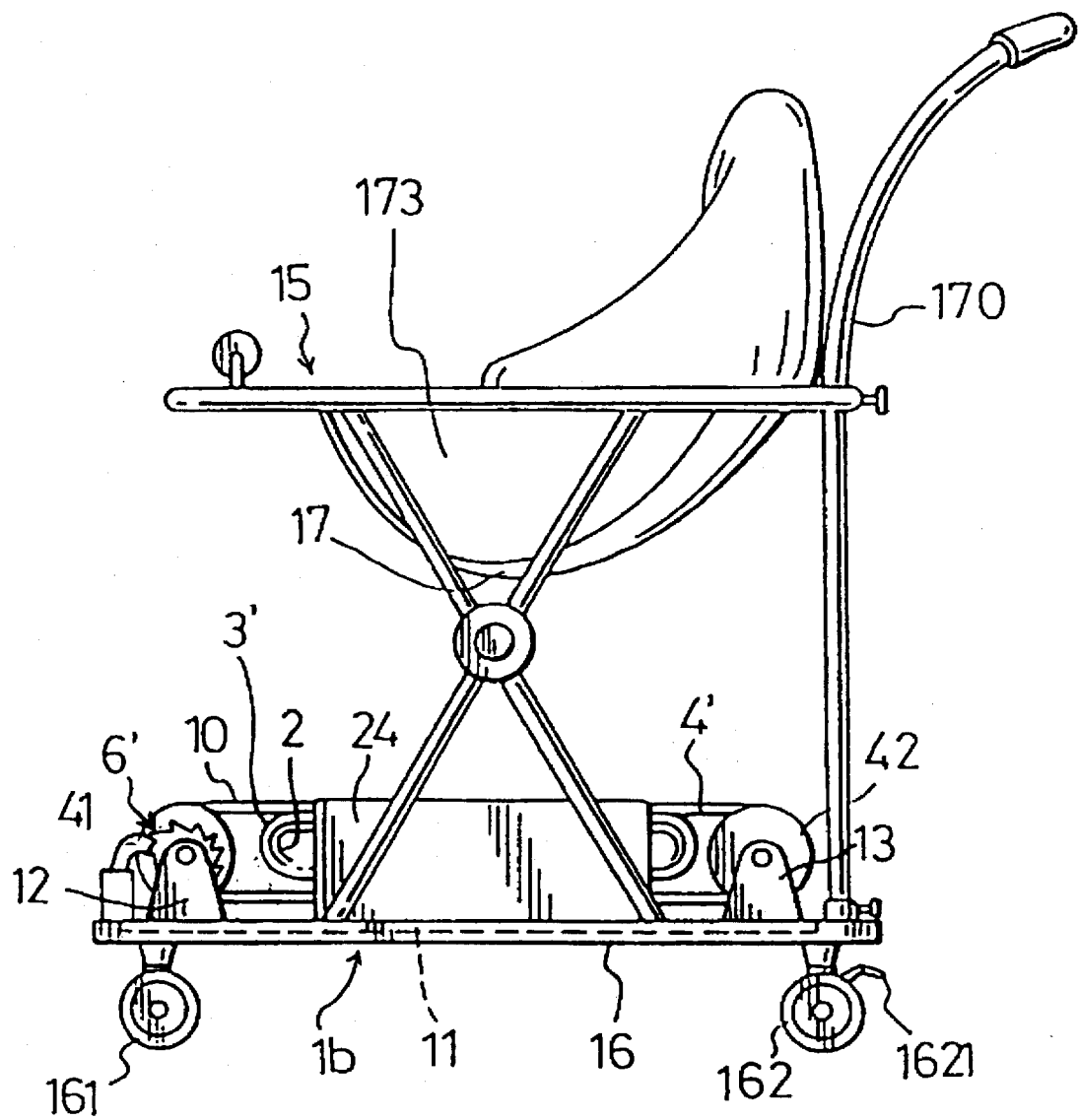
FIG. 5 is a schematic side view of the first preferred embodiment when attached to a second example of a functional supporting frame so as to serve as a combined baby stroller and walker.

Referring to FIG. 5, the first preferred embodiment may be attached to a functional supporting frame 1b that is in the form of a baby stroller. The functional supporting frame 1b comprises an upper frame portion 15, a lower frame portion 16 provided with front and rear wheels 161, 162 and connected to the base 11 to support the base 11 under the upper frame portion 15, and a baby seat 17 secured to the upper frame portion 15. The functional supporting frame 1b may be provided with a removable handle unit 170, which is attached removably to the upper and lower frame portions 15, 16 for pushing the functional supporting frame 1b. Furthermore, the front wheels 161 may be provided with a respective swivel which is rotatable about longitudinal axes of supporting legs of the front wheels 161 in a known manner, while the rear wheels 162 may be provided with a respective brake 1621.

Figure 6:
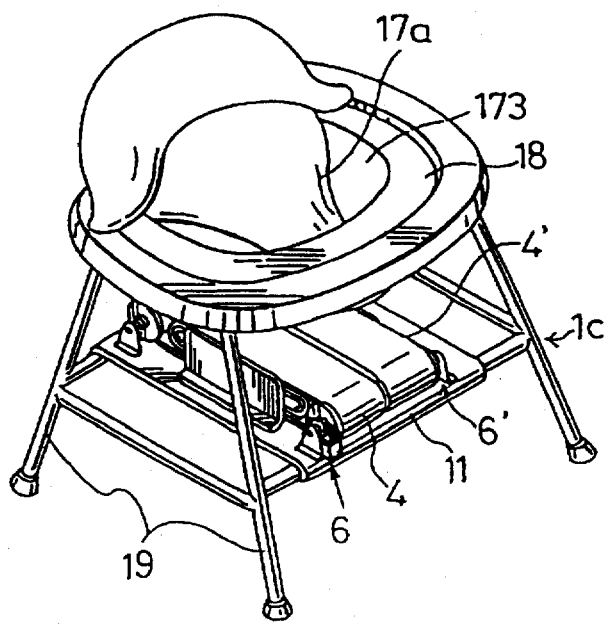
FIG. 6 is a perspective view of the first preferred embodiment when attached to a third example of a functional supporting frame so as to serve as a combined baby chair and walker.

Referring to FIG. 6, the first preferred embodiment may be attached to a functional supporting frame 1c that is in the form of a baby chair. The functional supporting frame 1c comprises a looped upper frame portion 18, a plurality of leg members 19 having upper sections connected to the upper frame portion 18 and lower sections connected to the base 11 to support the base 11 under the upper frame portion 18, and a baby seat 17a secured to the upper frame portion 18.

Figure 7:
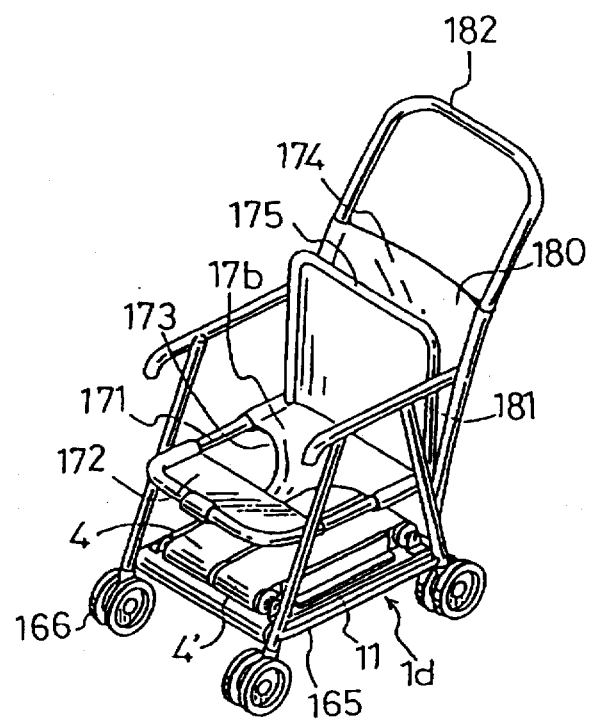
FIG. 7 is a schematic side view of the first preferred embodiment when attached to a fourth example of a functional supporting frame so as to serve as another combined baby stroller and walker.

Referring to FIG. 7, the first preferred embodiment may be attached to a functional supporting frame 1d that is in the form of another baby stroller. The functional supporting frame 1d comprises a stroller frame having an upper frame portion 180 formed with a pair of armrests 181 and a generally inverted U-shaped handle 182 connected to rear ends of the armrests 181, and a lower frame portion 165 provided with a plurality of wheels 166 and connected to the base 11 to support the base 11 thereon. A baby seat 17b includes a seat bar 171 mounted to the stroller frame and positioned under the armrests 181, a backrest portion 174 secured to the handle 182, a flexible seat portion 172 secured to the seat bar 171, and a solid seat portion 175 mounted pivotally to the seat bar 171 and movable between a first position, wherein the solid seat portion 175 overlies the flexible seat portion 172, and a second position, wherein the solid seat portion 175 rests on the backrest portion 174.

When the first preferred embodiment is used with the functional supporting frame 1b, 1c or 1d, a pair of leg holes 173 formed in the baby seats 17, 17a, 17b permits the legs of a baby to extend toward the base 11 so as to tread the foot belts 4, 4'. A baby can thus be taught to stand and walk with the use of the walker apparatus of the present invention. Unlike the conventional wheeled open-bottom baby walker, the present invention is safe to use since the baby is prevented from moving around the room and from bumping into furniture or from falling down the stairs. The functional supporting frames 1b, 1c, 1d may be further provided with safety belts (not shown) for strapping the baby thereon.

Figure 8:
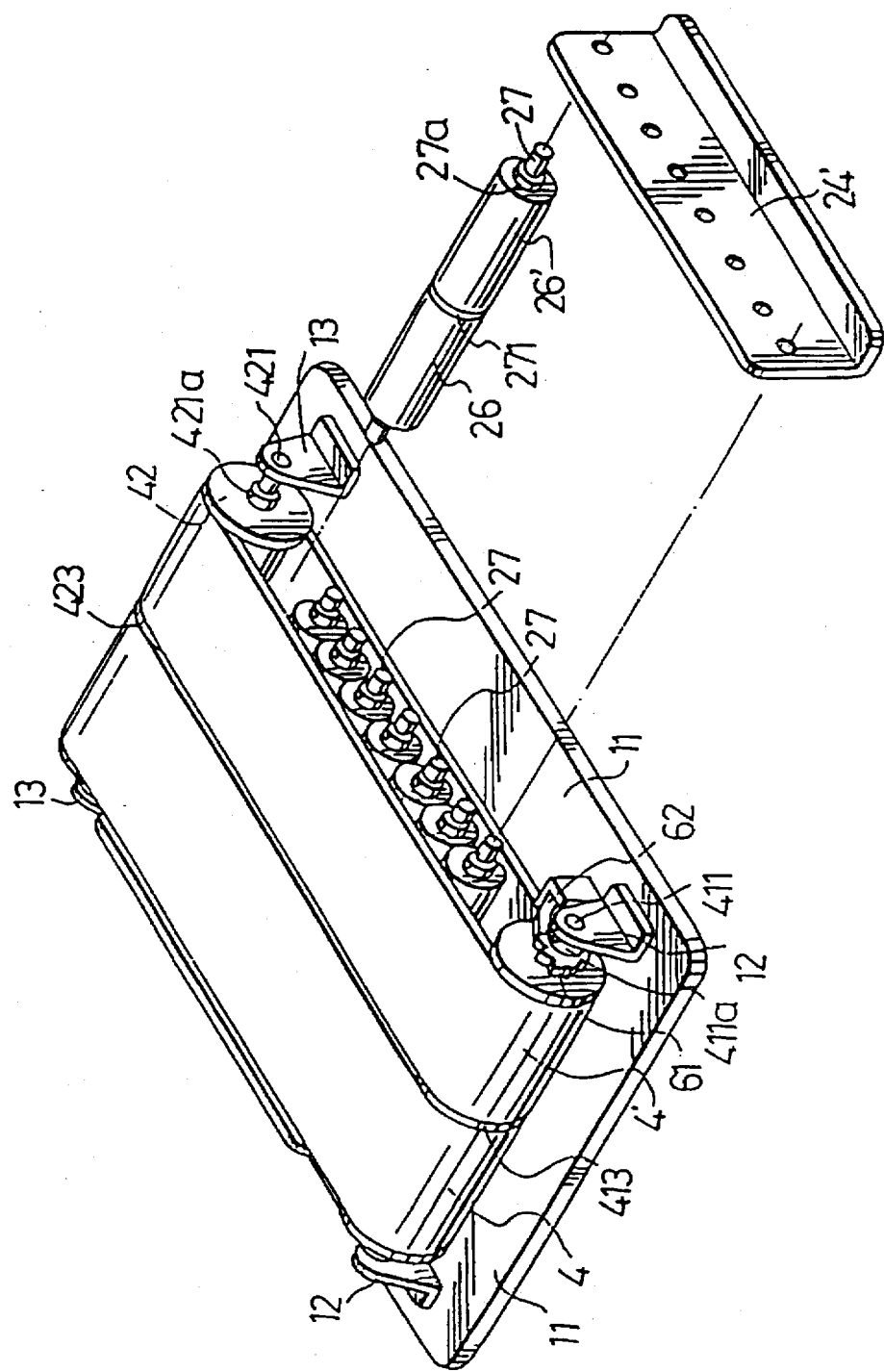
FIG. 8 is a perspective, partly exploded view of the second preferred embodiment of a walker apparatus according to the present invention.
Figure 9:
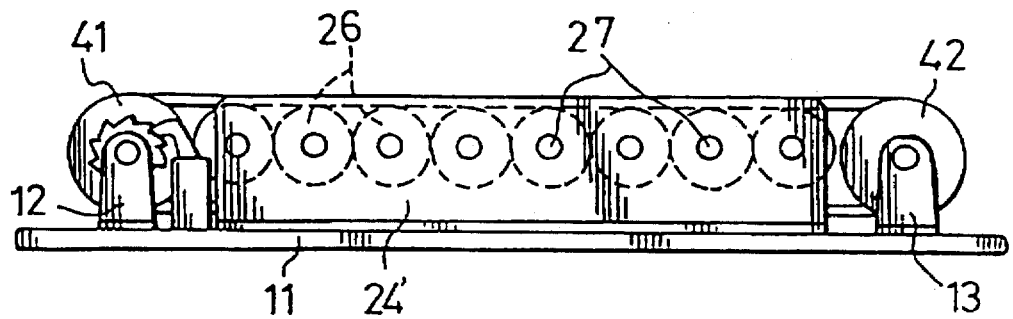
FIG. 9 is a schematic side view of the second preferred embodiment.

Referring to FIGS. 8 and 9, the second preferred embodiment of a walker apparatus according to the present invention is shown to similarly comprise a base 11, a pair of front rollers 41, a pair of rear rollers 42, endless left and right foot belts 4, 4', and a support unit. The main difference between the first and second embodiments resides in the configuration of the support unit.

In the second preferred embodiment, each of the foot belts 4, 4' is wound circulatively on the respective one of the front rollers 41 and on the respective one of the rear rollers 42, and the support unit includes a plurality of adjacent parallel third shafts 27 between the front and rear rollers 41, 42. The third shafts 27 have axes which are parallel to the first and second shafts 411, 421, and two ends which are secured on a pair of side brackets 24' that extend upwardly from opposite longitudinal sides of the base 11. The support unit further includes a plurality of pairs of intermediate left and right rollers 26, 26'. Each of the pairs of intermediate left and right rollers 26, 26' is mounted rotatably on a respective one of the third shafts 27. A spacer 271 is provided on the central portion of each of the third shafts 26 to space apart the left and right rollers 26, 26' thereon. Each of the intermediate right rollers 26' contacts the right foot belt 4', while each of the intermediate left rollers 26 contacts the left foot belt 4. The rollers 26, 26' thus provide a supporting surface for the foot belts 4, 4'. When the user applies a moving weight, such as his left and right feet, on the left and right foot belts 4, 4' between the pair of front rollers 41 and the pair of rear rollers 42, the foot belts 4, 4' will drive frictionally the rollers 26, 26' and the rollers 41, 42. Each of the third shafts 27 further has two opposite end portions provided with a pair of retainers 27a to limit lateral movement of the intermediate left and right rollers 26, 26' thereon.

Like the previous embodiment, the walker apparatus of the second preferred embodiment can also be installed with any of the previously described functional supporting frames 1a, 1b, 1c, 1d. The operation of the second preferred embodiment is substantially similar to that of the previous embodiment and will not be detailed further.

Figure 10:
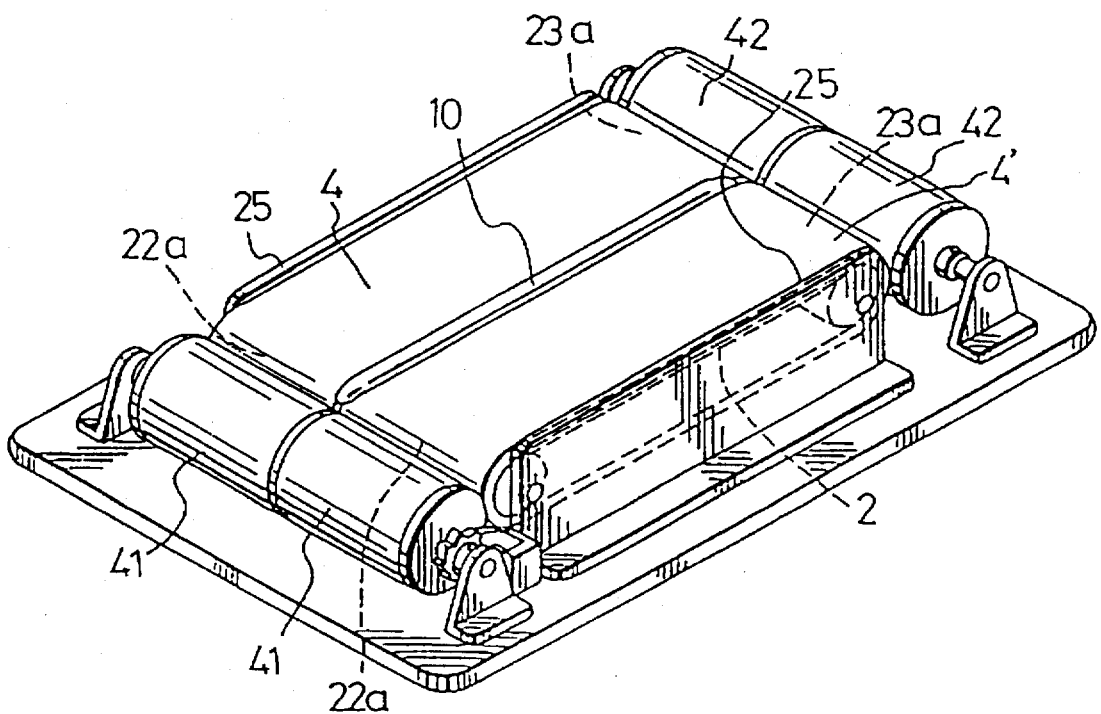
FIG. 10 is a perspective view of the third preferred embodiment of a walker apparatus according to the present invention.

Referring to FIG. 10, the third preferred embodiment of a walker apparatus according to the present invention is shown to be substantially similar to the first preferred embodiment. In this embodiment, the support unit comprises a substrate plate 2 secured on the base 11 and having a slippery top surface. However, no endless inner belts are employed in the third preferred embodiment. Instead, front and rear pairs of substrate end rollers 22a, 23a are mounted on the base 11 adjacent to front and rear ends of the substrate plate 2 and adjacent to a respective one of the pairs of front and rear rollers 41, 42. Each of the substrate end rollers 22a, 23a has a slippery surface. Each of the foot belts 4, 4' is wound around the substrate plate 2 and passes between and is in operating contact with one of the front rollers 41 and one of the front pair of substrate end rollers 22a, and further passes between and is in operating contact with one of the rear rollers 42 and one of the rear pair of substrate end rollers 23a. Each of the foot belts 4, 4' has an outer surface which is made of a friction material, such as rubber, to provide traction with the user's feet, and an inner surface which is made of a slippery material, such as a silicone-coated material, to contact the substrate plate 2. Since the outer and inner surfaces of the foot belts 4, 4' have different properties, each of the foot belts 4, 4' may be in the form of a laminate, the layers of which may be joined in any suitable fashion, such as by sewing, gluing and the like. Alternatively, a silicone coating may be applied directly on the inner surfaces of the foot belts 4, 4' to achieve the same effect.

As with the first preferred embodiment, the substrate plate 2 further has an upwardly projecting longitudinal partition member 10 which separates the foot belts 4, 4', and a pair of upwardly extending flanges 25 which extend on opposite longitudinal edges thereof to limit lateral movement of the foot belts 4, 4'.

Like the previous embodiments, the third preferred embodiment can also be installed with any of the previously described functional supporting frames 1i a, 1b, 1c, 1d. The operation of the third preferred embodiment is substantially similar to that of the first preferred embodiment and will not be detailed further.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A walker apparatus comprising:

a functional support frame;

a flat elongated substrate plate secured to the frame, the substrate plate having a first end opposite a second end and a left side opposite a right side, the substrate plate also including a slippery top surface extending generally between the first and second ends;

a first pair of rollers positioned adjacent to the first end of the substrate plate, the first pair of rollers including a first left roller and a first right roller, the first left and right rollers being generally co-axially aligned along a first axis and being rotatable about the first axis;

a second pair of rollers positioned adjacent to the second end of the substrate plate, the second pair of rollers including a second left roller and a second right roller, the second left and right rollers being generally co-axially aligned along a second axis that is generally parallel to the first axis, the second left and right rollers being rotatable about the second axis;

an endless left foot belt that is supported by the top surface of the substrate plate and wound over the first and second left rollers, and an endless right foot belt that is supported by the top surface of the substrate plate and wound over the first and second right rollers, the left foot belt and the right foot belt each including a frictional outer surface and a slippery inner surface; and means for reducing friction between the inner surfaces of the belts and the slippery top surface of the substrate plate such that the belts are adapted to slide across the top surface of the substrate plate as a user treads upon the belts.

2. The walker apparatus of claim 1, further comprising a ratchet mechanism operatively connected to the left foot belt and the right foot belt, wherein the ratchet mechanism prevents the left and right foot belts from sliding in a first direction along the top surface of the substrate plate while allowing the left and right foot belts to slide in a second direction along the top surface of the substrate plate.

3. The walker apparatus of claim 2, wherein the ratchet mechanism includes a pair of ratchet gears that cooperate with a pair of pawls, the pawls being moveable between first positions in which the pawls engage the ratchet gears, and second positions in which the pawls are disengaged from the ratchet gears.

4. The walker apparatus of claim 2, wherein the ratchet mechanism includes a first ratchet gear mounted at the first right roller and cooperating with a first pawl, and a second ratchet gear mounted at the first left roller and cooperating with a second pawl.

5. The walker apparatus of claim 2, wherein the ratchet mechanism includes left and right exterior rollers that respectively engage the outer surfaces of the left foot belt and the right foot belt, and the ratchet mechanism also includes a left ratchet gear and pawl assembly cooperating with the left exterior roller and a right ratchet and pawl assembly cooperating with the right exterior roller.

6. The walker apparatus of claim 1, further comprising a ratchet mechanism constructed and arranged to prevent the left and right foot belts from sliding in a first direction along the top surface of the substrate plate while allowing the left and right foot belts to slide in a second direction along the top surface of the substrate plate.

7. The walker apparatus of claim 6, wherein the ratchet mechanism includes a left gear and pawl assembly cooperating with at least one of the first and second left rollers and a right gear and pawl assembly cooperating with at least one of the first and second right rollers.

8. The walker apparatus of claim 1, wherein the functional support frame includes a pair of hand rails located adjacent to the left and right sides of the substrate plate.

9. The walker apparatus of claim 1, wherein the functional support frame includes a baby seat positioned a desired height above the top surface of the substrate plate, the baby seat including a pair of leg holes to permit legs of a baby to extend toward the substrate plate so as to tread on the foot belts.

10. The walker apparatus of claim 1, wherein the functional support frame includes an upper frame portion positioned above the substrate plate and a lower frame portion positioned below the substrate plate, the upper frame portion being constructed and arranged to support a baby seat having a pair of leg holes that permit legs of a baby to extend toward the substrate plate so as to tread on the foot belts, and the lower frame portion being provided with front and rear wheels for allowing the walker apparatus to be moved along a ground surface, the functional supporting frame also includes a handle unit for pushing the walker apparatus.

11. The walker apparatus of claim 1, further comprising means for limiting lateral movement of the belts.

12. The walker apparatus of claim 1, wherein the means for reducing friction comprises a slippery substance on the substrate plate.

13. The walker apparatus of claim 12, wherein the slippery substance comprises silicon.

14. A walker apparatus comprising:

a functional support frame;

a flat elongated substrate plate secured to the frame, the substrate plate having a first end opposite a second end and a left side opposite a right side, the substrate plate also including a slippery top surface extending generally between the first and second ends;

a first arcuate guide structure positioned at the first end of the substrate plate;

a second arcuate guide structure positioned at the second end of the substrate plate;

an endless left foot belt and a separate endless right foot belt that are supported by the top surface of the substrate plate and wound over the first and second arcuate guide structures, the left foot belt and the right foot belt each including a frictional outer surface and a slippery inner surface; and means for reducing friction between the inner surfaces of the belts and the slippery top surface of the substrate plate such that the belts are adapted to slide across the top surface of the substrate plate as a user treads upon the belts.

15. The walker apparatus of claim 14, wherein the first arcuate guide structure comprises separate first left and right rollers.

16. The walker apparatus of claim 15, wherein the second arcuate guide structure comprises second left and right rollers.

17. A walker apparatus comprising:

a frame;

a substantially flat elongated plate secured to the frame, the plate having a first end opposite a second end and a left side opposite a right side, the plate also including a top surface extending between the first and second ends;

a first arcuate guide structure positioned adjacent the first end of the plate;

a second arcuate guide structure positioned adjacent the second end of the plate; and an endless left foot belt and a separate endless right foot belt that are supported by the top surface of the plate and wound over the first and second arcuate guide structures, the left foot belt and the right foot belt being constructed and arranged to slide across the top surface of the plate as a user treads upon the belts.

18. The walker apparatus of claim 17, wherein the first arcuate guide structure comprises separate first left and right rollers.

19. The walker apparatus of claim 17, wherein the second arcuate guide structure comprises second left and right rollers.

* * * * *